United States Patent [19]
De Regenaucourt et al.

[11] 3,811,734
[45] May 21, 1974

[54] SPACER FOR A DUAL RIM AND SPOKED WHEEL ASSEMBLY

[75] Inventors: Robert A. De Regenaucourt, Centerville; Fred R. Caudill, Dayton, both of Ohio

[73] Assignee: The Dayton Steel Foundry Company, Dayton, Ohio

[22] Filed: May 11, 1972

[21] Appl. No.: 252,413

[52] U.S. Cl............................................. 301/13 SM
[51] Int. Cl............................................. B60b 11/06
[58] Field of Search.......................... 301/13 SM, 13

[56] References Cited
UNITED STATES PATENTS
2,884,280  4/1959  Atkin............................. 301/13 SM
1,901,629  3/1933  Burger........................... 301/13 SM FOREIGN PATENTS OR APPLICATIONS
1,095,210  12/1954  France............................. 301/13 R
337,432    3/1936   Italy............................... 301/13 SM
756,934    10/1933  France............................ 301/13 SM Primary Examiner—Richard J. Johnson
Attorney, Agent, or Firm—Mack D. Cook, II

[57] ABSTRACT

A positioned spacer for a dual rim and spoked wheel assembly having a strengthened medial portion and a series of alignment means received in correspondingly dimensioned openings in the spoke ends.

2 Claims, 6 Drawing Figures

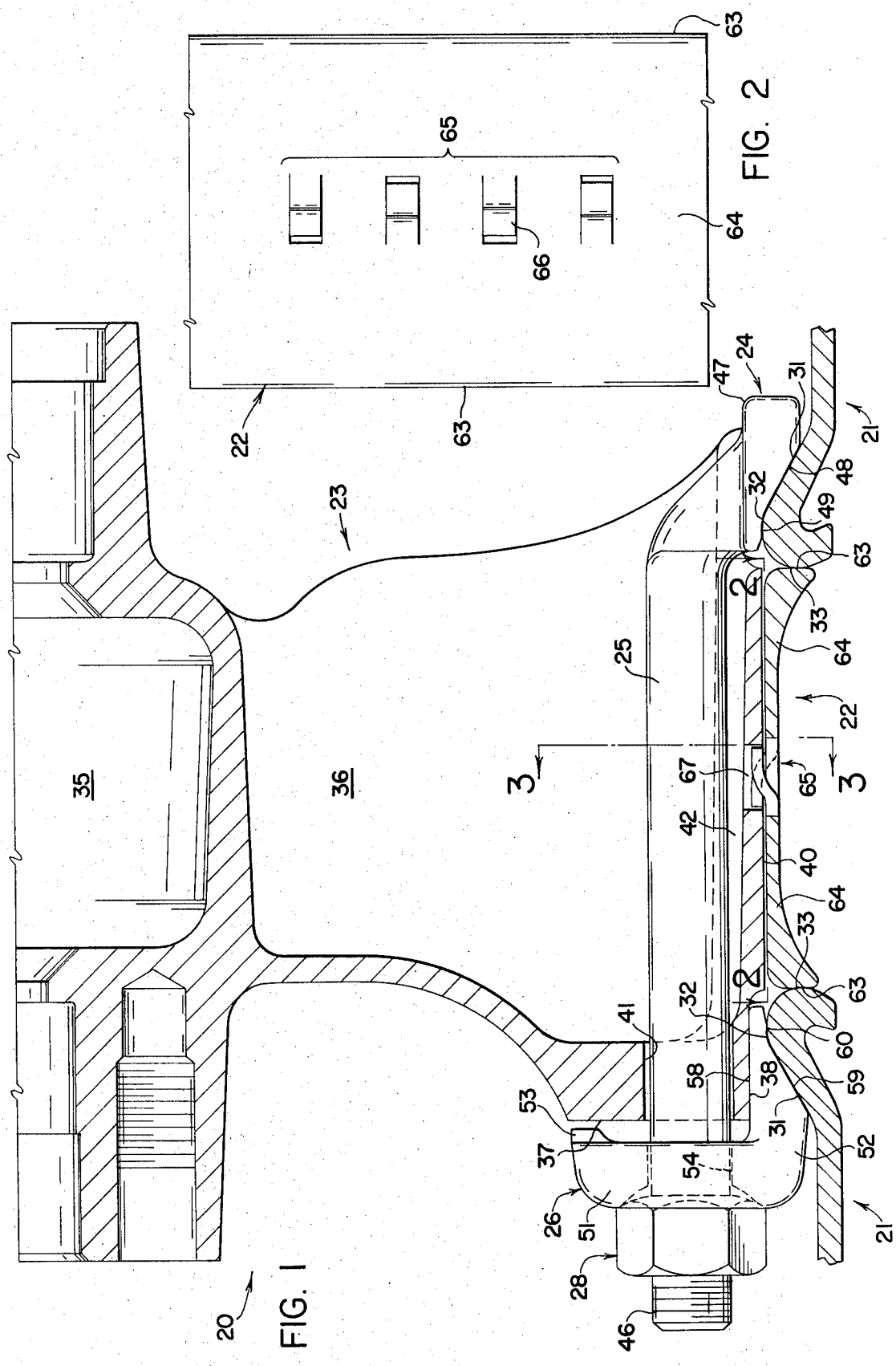

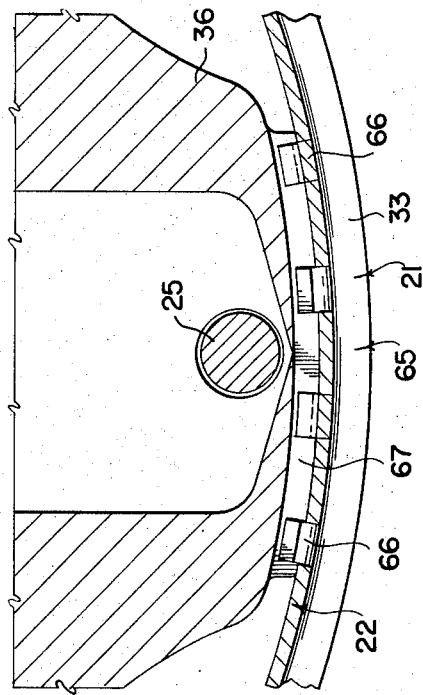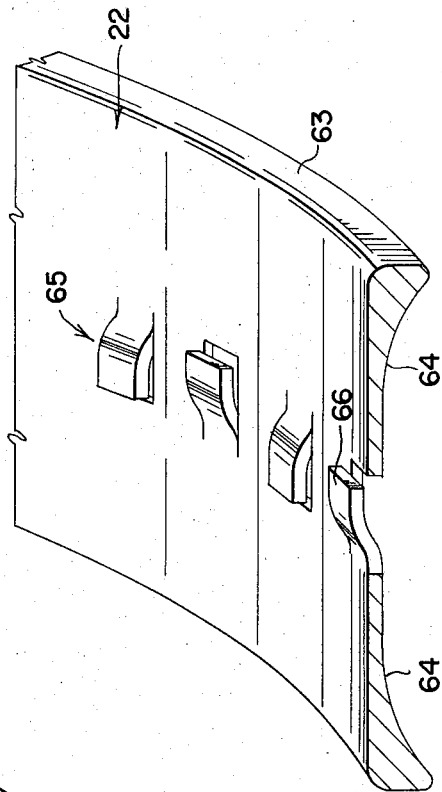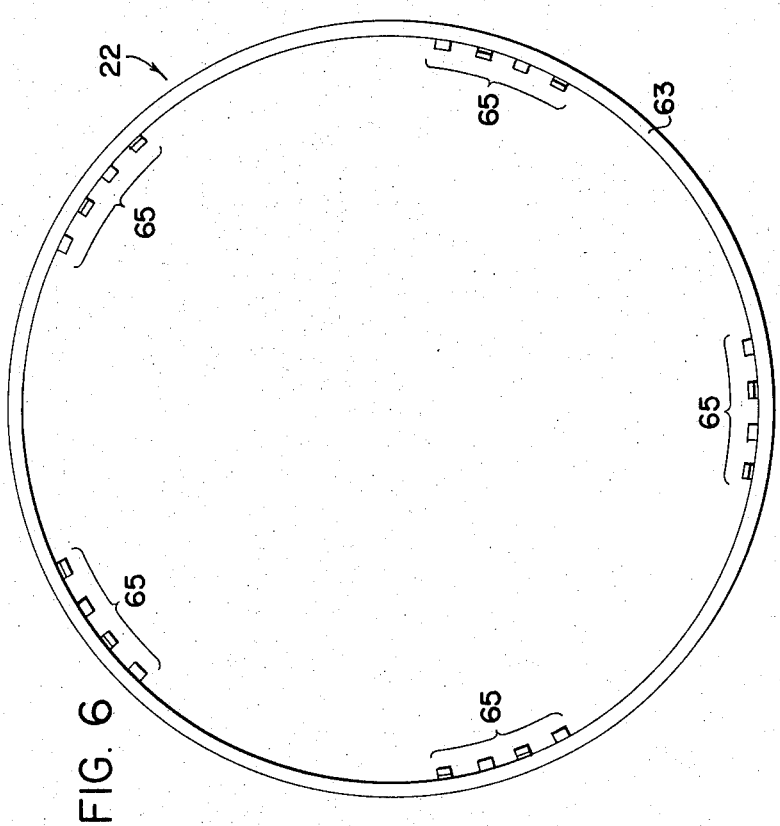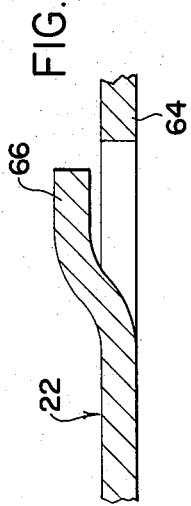

SPACER FOR A DUAL RIM AND SPOKED WHEEL ASSEMBLY

CROSS-REFERENCED TO RELATED APPLICATIONS

The use as clamping elements of sets of axially inner clamp means and axially outer clamp lugs supported by fastening elements extending axially through the wheel is the subject matter of co-pending application Ser. No. 252,412 filed May 11, 1972.

BACKGROUND OF THE INVENTION

The invention relates to a spacer for a dual rim and spoked wheel assembly. More particularly, the invention relates to a spacer for dual tire carrying rims mounted on a wheel, such as the rear wheel, of a vehicle, such as a truck or trailer.

A conventional assembly for mounting dual tires, as disclosed in U.S. Pat. No. 2,767,026 patented Oct., 1956 to The Dayton Steel Foundry Company, includes the vehicle wheel, inner and outer rims mounting the tires, a spacer, and clamping elements for secure mounting of the inner rim-spacer-outer rim assembly felloe of the wheel.

Conventional spacers have assumed a variety of shapes and forms. See, U.S. Pat. Nos. 2,100,626 patented Nov., 1937 to The Firestone Steel Products Company, No. 3,013,841 patented Dec., 1961 to The Dayton Steel Foundry Company, No. 3,143,376 patented Aug., 1964 to The Firestone Tire & Rubber Company, and No. 3,194,606 patented July, 1965 to The Dayton Steel Foundry Company.

Irrespective of the particular shape and form of the conventional and prior art spacers, each have the common characteristic of lateral flanges or marginal portions carried by a noncompressible medial portion engineered or constructed to maintain the flanges in fixed relative position when in operative contact or abutment with the rims. In other words, the prior art spacers had edges intended to merely mechanically restrict and prevent any relative movement of the inner and outer rims assembled with the spacer on the wheel and held in place by pressure of the clamping elements.

The prior art rigid spacers for dual rim and wheel assemblies have performed well. However, it has now been found that what may appear as insignificant differences in the strength and position, the dimensions and configuration, of a spacer in a dual rim and wheel assembly can — and with this invention — produce remarkably improved results or advantages. The improvements provided by the present invention are particularly manifest in assuring lateral alignment and minimizing radial runout of the rims when mounted, regardless of the technique employed by the mechanic in assembling the spacer and rims on a wheel. It has been found that no "judgment" is needed by a mechanic in mounting a dual rim and wheel assembly using a rigid spacer according to the invention.

SUMMARY OF THE INVENTION

The object of the invention is to provide an improved rigid spacer for a dual rim and spoked wheel assembly.

It is a further object of the invention to provide a spacer for a dual rim and spoked wheel assembly which is positioned or positively located on the wheel felloe so that the clamping elements cannot be torqued or over-tightened so as to distort lateral alignment or contribute to radial runout of the rims when mounted on a wheel.

These and other objects of the invention, and the advantages thereof, will be apparent in view of the Description of a Preferred Embodiment, and Alternative Embodiments, as set forth below.

In general, a spacer for a dual rim and spoked wheel assembly according to the invention is an annular member having radially oriented lateral edges and a generally concave medial portion extending edge-to-edge, the radially inner face thereof carrying a series of alignment means received in correspondingly dimensioned openings in the spoke ends.

In the Preferred Embodiment of the invention, the alignment means to the spacer comprise resilient projections axially oriented in alternate directions so as to frictionally engage correspondingly dimensioned circumferential slots in the spoke ends when rotated or "arced" into engagement therewith.

The spacer alignment means may also be other shapes and forms projecting radially inwardly into correspondingly dimensioned openings in the wheel.

DESCRIPTION OF THE DRAWINGS

FIG. 1 is a fragmentary sectional view of a spacer according to the invention in a dual rim and spoked wheel assembly, using clamping elements which are the subject matter of co-pending application Ser. No. 252,412 filed May 11, 1972;

FIG. 2 is a fragmentary view of the radially inner face of a spacer, taken substantially as indicated on line 2—2 of FIG. 1;

FIG. 3 is a sectional view, taken substantially as indicated on line 3—3 of FIG. 1;

FIG. 4 is a perspective view showing the cross-section of a spacer according to the invention;

FIG. 5 is a fragmentary view showing the cross-section of a spacer alignment means according to the invention; and, FIG. 6 is a plan view of a spacer having five series of alignment means on the radially inner face thereof, as for use with a five-spoke wheel.

DETAILED DESCRIPTION OF THE INVENTION

A dual rim and spoked wheel assembly, using a rigid spacer according to the invention, is referred to generally by the numeral 20. As shown in FIG. 1, in an assembly 20 the dual rims are mounted on the wheel and using the clamping elements which are subject matter of co-pending application Ser. No. 252,412 filed May 11, 1972. The assembly 20 is characterized in that the clamping elements, rather than the wheel, per se, provide a felloe, felly or load-bearing surfaces for the rim.

A spacer according to the invention could also be used in the environment of a prior art rim and spoke wheel assembly, with conventional clamping elements, as disclosed in U.S. Pat. No. 2,767,026, patented Oct. 1956 to the Dayton Steel Foundry Company. In this environment, the improved spacer would be used for the spacer 55, and the wheel felly 30 would be modified in accordance with the disclosure herein.

In an assembly 20, the dual inner and outer rims are referred to generally by the numeral 21. The improved spacer is referred to generally by the numeral 22. The spoked wheel is referred to generally by the numeral 23. The rims 21 are seated against the spacer 22 by the cooperative action of clamping elements comprising an axially inner clamp means referred to generally by the numeral 24, a fastening element referred to generally by the numeral 25, an axially outer clamp lug referred to generally by the numeral 25, an axially outer clamp lug referred to generally by the numeral 26 and a fastening means referred to generally by the numeral 28.

Each rim 21 may be a conventional flat base rim having a fixed bead flange and a removable bead flange (not shown). As shown, the mounting flange of a rim 21 has an axially inner holding surface 31, preferably inclined at an angle at 28° from the rotational axis of the rim. The holding surface 31 intersects and merges into a radially inner seating surface 32, preferably axially oriented substantially horizontal or parallel to the rotational axis of the rim. The seating surface 32 intersects and merges into an axially outer gutter or positioning surface 33, preferably radially oriented substantially vertical or perpendicular to the rotational axis of the rim. The rim mounting surfaces 31, 32 and 33 depict a conventional form of a mounting flange for rims which may be assembled on a wheel using a spacer according to the invention. The angularity of these surfaces could be varied somewhat in relation to the rotational axis of the rims while still utilizing the subject matter of the invention.

The wheel 23 is a cast spoked wheel having a conventional hub area 35. Any desired number of spokes 36, preferably five or six, extend radially of the hub area 35.

The peripheral portion of each spoke 36 has a boss surface 37 radially oriented substantially vertically or perpendicular to the rotational axis of the wheel, an intersecting concave surface 38 axially oriented substantially horizontal or parallel to the rotational axis of the wheel, and a larger diameter axially extended medial surface 40 oriented substantially horizontal or parallel to the rotational axis of the wheel. The surfaces 38 seat the clamp lugs 26. The surfaces 40 carry the spacer 22.

An axially oriented bore 41, for loosely receiving the shank of the fastening elements in the form of support bolts 25 for the clamp means 24 and clamp lugs 26, extends through the peripheral portion of a wheel 23 radially inwardly of the surface 38. The outer end of a bore 41 opens onto boss surface 37. The inner end of a bore 41 opens into an open area 42 radially inwardly of the medial surface 40.

A clamp means 24 is a one-piece solid element. The bolt portion 25 thereof, threaded as at 46 for engagement with a fastening means 28 in the form of a nut, extends through a wheel bore 41 and parallel to the wheel surface 40 to join with a wedge portion 47. The radially outer face of a wedge portion 47 has a conical surface 48 and an intersecting axially oriented surface 49. A conical surface 48 matingly engages a correspondingly inclined inner rim flange mounting surface 31. An axially oriented surface 49 matingly engages an inner rim flange seating surface 32.

A clamp lug 26 has a radially directed leg 51 and an axially directed leg 52 and the general shape of a conventional clamp lug, such as element 14 disclosed in U.S. Pat. No. 3,160,441, patented Dec., 1964 to the Dayton Steel Foundry Company.

A clamp lug radial leg 51 is generally triangular in shape having an apex with a radially oriented stop surface 53. The stop surface 53 projects axially toward a wheel boss surface 37. A leg 51 also has an axially oriented bore 54 for receiving a support bolt 25. The bore 54 is centered so that a support bolt 25 will be axially oriented substantially horizontal or parallel to the rotational axis of the wheel when a clamp lug axial leg 52 is seated on a wheel surface 38.

A clamp lug axial leg 52 has an axially oriented convex surface 58 for sliding and seating engagement with a wheel surface 38. The radially outer face of the axial leg 52 has a conical surface 59 and an intersecting axially oriented surface 60. A conical surface 59 matingly engages a correspondingly inclined outer rim flange mounting surface 31. An axially oriented surface 60 matingly engages an outer rim flange seating surface 32.

A spacer 22 has radially oriented lateral edges 63 for seating against and between positioning surfaces 33 on the mounting flanges of the dual rims 21. The spacer 22 is strengthened by a generally concave medial portion 64 extending edge to edge. The radially inner face of the spacer 22 carries a series of alignment means indicated at 65. Preferably there is an alignment means 65 for each stroke of a wheel.

As best shown in FIGS. 4 and 5, a spacer alignment means 65 may comprise a plurality of, preferably four, resilient projections 66 formed as by stamping the medial portions 64 of a spacer 22. The projections 66 are axially oriented in alternate directions so as to frictionally engage correspondingly dimensioned slots 67 in the surface 40 of each stroke 36 of a wheel 23.

When utilizing the spacer 22 according to the invention in an assembly 20, the clamp means are positioned with the support bolts projecting outwardly through the wheel bores. The inner rim (carrying a tire) is fitted over the wheel until the rim flange mounting surface contacts the clamp means. The spacer is then positioned so that the alignment means 65 will pass between the spokes 36 and fitted on the wheel against the inner rim. The spacer is then rotated until the alternating projections 66 are seated within and in frictional contact with the spoke slots 67. Then, the outer rim is lifted into place and the clamp lugs are sequentially mounted on the support bolts. Thereafter, tightening of the nuts will draw the clamp means axially outwardly to seat the inner rim flange. Continued tightening of the nuts will precisely and accurately move the inner and outer rim flange positioning surfaces 33 into contact with the spacer edges 63 correctly mounting the dual tire carrying rims.

The spacer 22 as disclosed herein represents the Preferred Embodiment of the Invention. However, the alignment means could have other shapes and forms projecting radially inwardly into correspondingly dimensioned openings in the spokes 36.

One Alternative Embodiment could be in the form of a series of circumferentially spaced alignment blocks received in correspondingly dimensioned circumferential slots in the spoke ends of a wheel 23. Another form of Alternative Embodiment could use a series of bolts inserted through drilled holes in the spacer into correspondingly spaced holes in the spoke ends.

Whatever the form of alignment means used, a strengthened and positioned spacer according to the invention will provide a dual rim and spoked wheel assembly which is positively located on the wheel felloe so that the clamping elements cannot be torqued or over-tightened so as to distort lateral alignment or contribute to radial runout of the rims when mounted on a wheel.

What is claimed is:

1. A positioned spacer (22) for a dual rim (21) and spoked wheel (23) assembly, said spacer having a strengthened medial portion (64) and a series of alignment means (65) received in correspondingly dimensioned openings (67) in the spoke ends (40) of said wheel, and used with a series of axially inner clamp means (24) and a series of axially outer clamp lugs (26) which cooperatively engage mounting surfaces (31, 32) on the flanges of inner and outer rims (21), said alignment means comprising resilient projections (66) axially oriented in alternate directions and frictionally engaging said spoke end openings when rotated into engagement therewith, said clamp means (24) each being a one-piece solid element having a support bolt (25) joined to a wedge portion (47) with a radially outer face having a conical surface (48) for mating engagement with a correspondingly inclined inner rim flange mounting surface (31) and an intersecting axially oriented surface (49) for mating engagement with an inner rim flange seating surface (32), said support bolt (25) extending axially through said wheel and a clamp lug (26) and carrying fastening means (28) attached axially outwardly of the wheel and said clamp lug, said clamp lugs (26) each having intersecting surfaces (58, 59) thereon for engaging an axially inner surface (31) and a radially inner surface (32) on the flange of the outer rim, the clamp means and clamp lugs being drawn axially together to seat the rim flanges against said spacer by the tightening of said fastening means on said support bolts, whereby, by positioning said spacer on said spoke ends, each set of clamp means and clamp lugs cannot be torqued or over tightened so as to direct lateral alignment or contribute to radial runout of said rims when mounted on said wheel.

2. A spacer according to claim 1 wherein said projections are stamped from the medial portion of said spacer.

* * * * *

UNITED STATES PATENT OFFICE
CERTIFICATE OF CORRECTION

Patent No. 3,811,734　　　　　Dated　May 21, 1974

Inventor(s) Robert A. De Regenaucourt et al.

It is certified that error appears in the above-identified patent and that said Letters Patent are hereby corrected as shown below:

Column 2, line 17, "means to" should read -- means of --. Column 3, line 6, cancel "an axially outer clamp lug referred"; line 7, cancel "to generally by the numeral 25". Column 4, line 26, "stroke" should read -- spoke --; line 33, "stroke" should read -- spoke --.

Signed and sealed this 1st day of October 1974.

(SEAL)
Attest:

McCOY M. GIBSON JR.　　　　　　C. MARSHALL DANN
Attesting Officer　　　　　　　Commissioner of Patents